United States Patent
Baldwin et al.

(10) Patent No.: US 12,479,935 B2
(45) Date of Patent: *Nov. 25, 2025

(54) POLYMERIZATION PROCESSES FOR THE PRODUCTION OF CIS-1,4-POLYDIENES

(71) Applicants: Bridgestone Corporation, Tokyo (JP); Steven M. Baldwin, Akron, OH (US); Walter A. Salamant, Akron, OH (US)

(72) Inventors: Steven M. Baldwin, Akron, OH (US); Walter A. Salamant, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 436 days.

This patent is subject to a terminal disclaimer.

(21) Appl. No.: 17/787,749

(22) PCT Filed: Dec. 22, 2020

(86) PCT No.: PCT/US2020/066654
§ 371 (c)(1),
(2) Date: Jun. 21, 2022

(87) PCT Pub. No.: WO2021/133819
PCT Pub. Date: Jul. 1, 2021

(65) Prior Publication Data
US 2023/0089837 A1    Mar. 23, 2023

Related U.S. Application Data

(60) Provisional application No. 62/952,955, filed on Dec. 23, 2019.

(51) Int. Cl.
*C08F 4/54* (2006.01)
*C08F 136/04* (2006.01)
*C08F 136/08* (2006.01)

(52) U.S. Cl.
CPC .................. *C08F 136/08* (2013.01)

(58) Field of Classification Search
CPC ....... C08F 4/545; C08F 136/04; C08F 136/08
See application file for complete search history.

(56) References Cited

U.S. PATENT DOCUMENTS

| 6,130,299 A | 10/2000 | Sone et al. |
| 7,288,611 B2 | 10/2007 | Jiang et al. |

(Continued)

FOREIGN PATENT DOCUMENTS

| CN | 102887966 A | 1/2013 | |
| WO | WO-2018089635 A1 * | 5/2018 | ............... B60C 1/00 |

OTHER PUBLICATIONS

International Search Report and Written Opinion dated Apr. 15, 2021 for corresponding PCT/US2020/066654 (12 pp).

*Primary Examiner* — Catherine S Branch
(74) *Attorney, Agent, or Firm* — Meredith E. Hooker; Arthur M. Reginelli

(57) ABSTRACT

A process for preparing a polydiene, the process comprising (i) preparing an active catalyst composition by combining a rare-earth compound including a rare-earth metal, an alkylating agent, an aluminoxane, and optionally a halogen-containing compound, where the catalyst composition includes halogen at molar ratio to the rare-earth metal of from about 0.5:1 to about 2.0:1; and (ii) introducing the active catalyst composition to conjugated diene monomer.

20 Claims, 1 Drawing Sheet

(56) References Cited

U.S. PATENT DOCUMENTS

| | | |
|---|---|---|
| 8,394,901 B2 | 3/2013 | Cui et al. |
| 9,228,037 B2 | 1/2016 | McCauley et al. |
| 9,365,666 B2 | 6/2016 | Kaita et al. |
| 9,796,801 B2 | 10/2017 | Kaita et al. |
| 10,087,312 B2 | 10/2018 | Matsushita et al. |
| 2003/0187162 A1 | 10/2003 | Rachita et al. |
| 2004/0127665 A1 | 7/2004 | Balducci et al. |
| 2005/0113544 A1 | 5/2005 | Jiang et al. |
| 2005/0130835 A1 | 6/2005 | Laubre et al. |
| 2012/0123070 A1 | 5/2012 | Boisson et al. |
| 2014/0378630 A1 | 12/2014 | McCauley et al. |
| 2019/0169330 A1 | 6/2019 | Qin |

\* cited by examiner

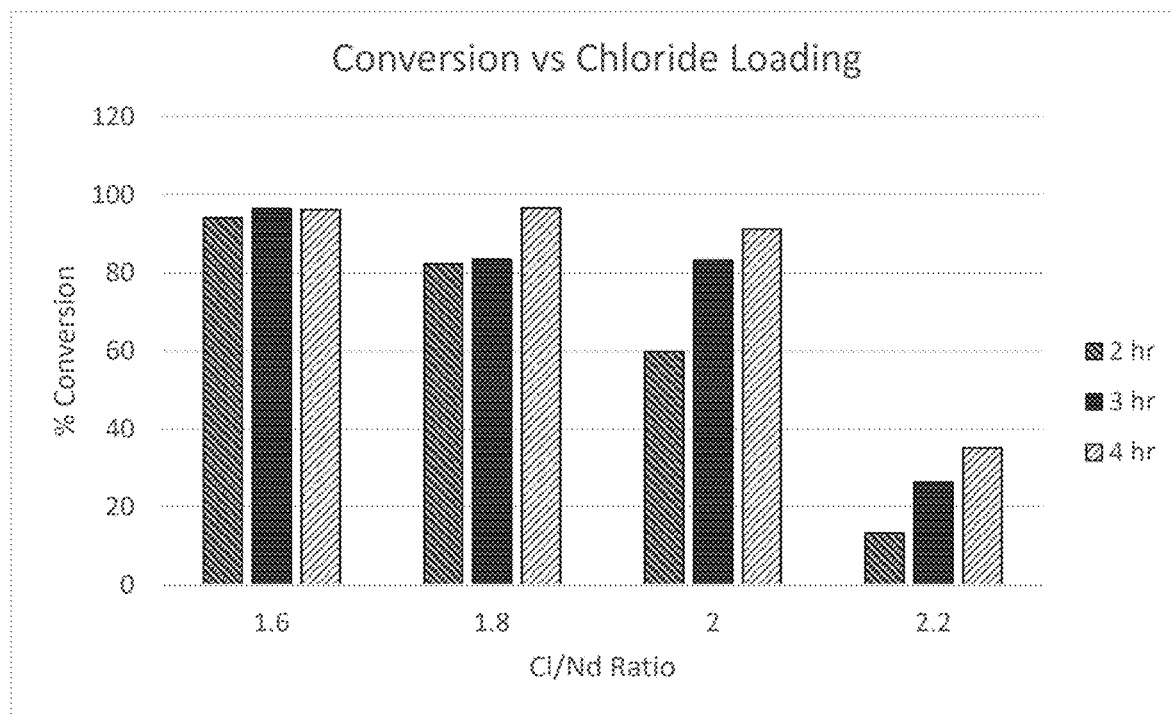

POLYMERIZATION PROCESSES FOR THE PRODUCTION OF CIS-1,4-POLYDIENES

FIELD OF THE INVENTION

Embodiments of the present invention are directed toward a polymerization processes for the production of cis-1,4-polydienes by using a rare-earth catalyst system. According to embodiments of the invention, the amount of halogen employed to activate the system is maintained at threshold levels to achieve to achieve desired catalyst activity and polymer properties.

BACKGROUND OF THE INVENTION

Rare-earth catalyst systems that comprise a rare earth compound, an alkylating agent, and a halogen source are known to be useful for producing conjugated diene polymers having high cis-1,4-linkage contents. It is known that cis-1,4-polydienes having higher cis contents, as well as relatively low molecular weight distribution, provide rubber vulcanizates having a greater ability to undergo strain-induced crystallization and lower hysteresis, which in turn provides advantageous physical properties such as higher tensile strength and higher abrasion resistance.

While efforts have been made to develop catalysts and processes for producing cis-1,4-polydienes having higher cis contents, there is also a desire to ensure that these processes are industrially efficient.

SUMMARY OF THE INVENTION

Embodiments of the present invention provide a process for preparing a polydiene, the process comprising (i) preparing an active catalyst composition by combining a rare-earth compound including a rare-earth metal, an alkylating agent, an aluminoxane, and optionally a halogen-containing compound, where the catalyst composition includes halogen at molar ratio to the rare-earth metal of from about 0.5:1 to about 2.0:1; and (ii) introducing the active catalyst composition to conjugated diene monomer.

BRIEF DESCRIPTION OF THE DRAWINGS

The Figure is a graphical representation of experimental evidence showing unexpected results of the present invention.

DETAILED DESCRIPTION OF ILLUSTRATIVE EMBODIMENTS

Embodiments of the present invention are based, at least in part, on the discovery of a polymerization process for producing polydienes by polymerizing conjugated diene monomer with certain rare-earth catalyst systems. In particular, it has now been discovered that by employing threshold amounts of halogen used to activate the catalyst, the catalyst activity and polymer properties, such as cis-1, 4-linkage content, can be advantageously balanced. While the prior art proposes the use of catalyst systems similar to those employed in the present invention, the prior art fails to appreciate these discoveries. In particular embodiments, gadolinium-based catalysts systems are activated with halogen-containing compounds and used to polymerize isoprene. In these or other embodiments, it has also been discovered that advantageous polymer properties can be obtained by polymerizing monomer with certain rare-earth catalyst systems at relatively high solids concentrations. While the high-solids polymer cement presents processing issues, the problems encountered are alleviated by diluting the cement after polymerization.

RARE EARTH CATALYST SYSTEM

In one or more embodiments, the rare earth catalyst system employed in the practice of the present invention includes (i) a rare-earth compound, (ii) an alkylating agent, (iii) an aluminoxane, and (iv) a halogen-containing compound.

RARE EARTH COMPOUND

The rare earth compound includes a lanthanide-series metal, scandium, or yttrium. As those skilled in the art appreciate, lanthanide-series metals include cerium, dysprosium, erbium, europium, gadolinium, holmium, lanthanum, lutetium, neodymium, praseodymium, promethium, samarium, terbium, thulium, and ytterbium. In particular embodiments, the rare-earth compound is a gadolinium compound.

In one or more embodiments, the rare-earth compound is a rare-earth amide, which may also be referred to as a rare-earth azanide. According to embodiments of the invention, the rare-earth amide may be defined by the formula

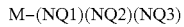

where M is a rare-earth metal, and NQ1, NQ2, and NQ3 are each individually an amino group, which may also be referred to as amide ligands.

In one or more embodiments, the amino groups include dihydrocarbylamino, bis(trihydrocarbylsilyl)amino, bis(dihydrocarbylhydrosilyl)amino, 1-aza-disila-1-cyclohydrocarbyl, (trihydrocarbylsilyl) (hydrocarbyl)amino, (dihydrocarbylhydrosilyl)(hydrocarbyl)amino, 1-aza-2-sila-1-cyclohydrocarbyl, dihydrocarbylamino, and 1-aza-1-cyclohydrocarbyl groups.

In one or more embodiments, the hydrocarbyl groups, including substituted hydrocarbyl groups, include, but are not limited to, alkyl, cycloalkyl, alkenyl, cycloalkenyl, aryl, allyl, aralkyl, alkaryl, or alkynyl groups. Substituted hydrocarbyl groups include hydrocarbyl groups in which one or more hydrogen atoms have been replaced by a substituent such as an alkyl group. In one or more embodiments, these groups may include from one, or the appropriate minimum number of carbon atoms to form the group, to 20 carbon atoms. These groups may also contain heteroatoms such as, but not limited to, nitrogen, boron, oxygen, silicon, sulfur, tin, and phosphorus atoms.

Exemplary types of dihydrocarbyl amino groups include dialkylamino, dicycloalkylamino, diaryl amino, and mixed dihydrocarbylamino groups such as alkylarylamino groups. Exemplary dialkylamino groups include, without limitation, dimethylamino, diethylamino, and diisopropyl amino groups. Exemplary diaryl aminos include, without limitation, diphenylamino groups. Exemplary mixed dihydrocarbylamino groups include, without limitation, 2,6-di-tert-butylphenyl amino, 2,6-diisopropylphenyl amino, 2,6-dineopentilphenyl amino, 2-tert-butyl-6-isopropyphenyl amino, 2-tert-butyl-6-neopentylphenyl amino, 2-isopropyl-6-neopentylphenyl amino, and 2,4,6-tert-butylphenyl amino groups.

In one or more embodiments, silyl groups, which include substituted silyl groups, include, but are not limited to, trihydrocarbylsilyl, trisilyloxysilyl, trihydrocarbyloxysilyl, trisilylsilyl, dihydrocarbylhydrosilyl, dihydrocarbyl(silyloxy)silyl, dihydrocarbyl(silyl)silyl, dihydrocarbyl(hydrocarbyloxy)silyl, hydrocarbyldihydrosilyl, hydrocarbyl(disilyloxy)silyl, hydrocarbyl(disilyl)silyl, and hydrocarbyl (dihydrocarbyloxy)silyl groups. Specific types of silyl groups may include, for example, trialkylsilyl, dialkylhydrosilyl, dialkyl(silyloxy)silyl, dialkyl(silyl)silyl, tricycloalkylsilyl, dicycloalkylhydrosilyl, dicycloalkyl(silyloxy)silyl, dicycloalkyl(silyl)silyl, trialkenylsilyl, dialkenylhydrosilyl, dialkenyl(silyloxy)silyl, dialkenyl(silyl)silyl, tricycloalkenylsilyl, dicycloalkenylhydrosilyl, dicycloalkenyl(silyloxy)silyl, dicycloalkenyl(silyl)silyl, triarylsilyl, diarylhydrosilyl, diaryl(silyloxy)silyl, diaryl(silyl)silyl, triallylsilyl, diallylhydrosilyl, diallyl(silyloxy)silyl, diallyl(silyl)silyl, triaralkylsilyl, diaralkylhydrosilyl, diaralkyl(silyloxy)silyl, diaralkyl(silyl)silyl, trialkarylsilyl, dialkarylhydrosilyl, dialkaryl(silyloxy)silyl, dialkaryl(silyl)silyl, trialkynylsilyl, dialkynylhydrosilyl, dialkynyl(silyloxy)silyl, dialkynyl(silyl)silyl, tris(trialkylsilyloxy)silyl, tris(triarylsilyloxy)silyl, tris(tricycloalkylsilyloxy)silyl, tris(trialkoxysilyloxy)silyl, tris(triaryloxysilyloxy)silyl, or tris(tricycloalkyloxysilyloxy)silyl groups. Substituted silyl groups include silyl groups in which one or more hydrogen atoms have been replaced by a substituent such as a hydrocarbyl, hydrocarbyloxy, silyl, or siloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

Specific non-limiting examples of rare-earth amides include tris bistrimethylsilylamide gadolinium, and bistrimethylsilylamide yttrium.

In other embodiments, the rare-earth metal compound is a rare-earth metallocene compound, which may also be referred to as a metallocene complex. As is known in the art, metallocene complexes include those complexes where a metal is coordinated with one or two cyclopentadienyl or cyclopentadienyl derivatives (e.g. indenyl). Depending on the valence of the metal, one or more additional compounds may be bound or coordinated to the metallocene complex. In one or more embodiments, where two cyclopentadienyl or cyclopentadienyl derivatives are coordinated to the metal atom, the metallocene complex may be referred to as a regular metallocene complex. In one or more embodiments, where only one cyclopentadienyl or cyclopentadienyl derivative is coordinated to the metal atom, the metallocene complex may be referred to as a half metallocene complex. In other embodiments, where the cyclopentadienyl or cyclopentadienyl derivative is connected to a cyclopentadienyl, cyclopentadienyl derivative, or another group coordinated to the metal, the metallocene complex may be referred to as a bridged metallocene complex.

In one or more embodiments, the metallocene complex may be defined by the formula I:

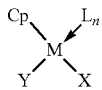

where M is a lanthanide-series element, scandium, or yttrium, Cp is a cyclopentadienyl group or a cyclopentadienyl derivative group, Y is a hydrocarbyloxy group, a thiohydrocarbyloxy group, an amino group, a silyl group, cyclopentadienyl group, or a cyclopentadienyl derivative group, X is hydrogen atom, a halogen atom, a hydrocarbyloxy group, a thiohydrocarbyloxy group, an amine group, a silyl group, or a monovalent organic group, each L is individually a neutral Lewis base, and n is a number from 0 through 3, or where Cp and Y are joined by a divalent group.

In one or more embodiments, cyclopentadienyl derivatives include compounds with at least one aromatic five-member ring structure. The five member ring structure of the cyclopentadiene derivatives can include one or more groups or ring structures bound to the five member ring structure. In one or more embodiments, cyclopentadienyl derivatives may include 1,2,3,4,5-pentamethylcyclopentadiene, indenyl groups, or fluorenyl groups.

In one or more embodiments, types of silyl groups, which include substituted silyl groups, include, but are not limited to, trihydrocarbylsilyl, trisilyloxysilyl, trihydrocarbyloxysilyl, trisilylsilyl, dihydrocarbylhydrosilyl, dihydrocarbyl(silyloxy)silyl, dihydrocarbyl(silyl)silyl, dihydrocarbyl(hydrocarbyloxy)silyl, hydrocarbyldihydrosilyl, hydrocarbyl(disilyloxy)silyl, hydrocarbyl(disilyl)silyl, and hydrocarbyl(dihydrocarbyloxy)silyl groups. Specific types of silyl groups may include, for example, trialkylsilyl, dialkylhydrosilyl, dialkyl(silyloxy)silyl, dialkyl(silyl)silyl, tricycloalkylsilyl, dicycloalkylhydrosilyl, dicycloalkyl(silyloxy)silyl, dicycloalkyl(silyl)silyl, trialkenylsilyl, dialkenylhydrosilyl, dialkenyl(silyloxy)silyl, dialkenyl(silyl)silyl, tricycloalkenylsilyl, dicycloalkenylhydrosilyl, dicycloalkenyl(silyloxy)silyl, dicycloalkenyl(silyl)silyl, triarylsilyl, diarylhydrosilyl, diaryl(silyloxy)silyl, diaryl(silyl)silyl, triallylsilyl, diallylhydrosilyl, diallyl(silyloxy)silyl, diallyl(silyl)silyl, triaralkylsilyl, diaralkylhydrosilyl, diaralkyl(silyloxy)silyl, diaralkyl(silyl)silyl, trialkarylsilyl, dialkarylhydrosilyl, dialkaryl(silyloxy)silyl, dialkaryl(silyl)silyl, trialkynylsilyl, dialkynylhydrosilyl, dialkynyl(silyloxy)silyl, dialkynyl(silyl)silyl, tris(trialkylsilyloxy)silyl, tris(triarylsilyloxy)silyl, tris(tricycloalkylsilyloxy)silyl, tris(trialkoxysilyloxy)silyl, tris(triaryloxysilyloxy)silyl, or tris(tricycloalkyloxysilyloxy)silyl groups. Substituted silyl groups include silyl groups in which one or more hydrogen atoms have been replaced by a substituent such as a hydrocarbyl, hydrocarbyloxy, silyl, or siloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

In one or more embodiments, amino groups include those groups defined by the formula —$NR_2$, where each R is independently a monovalent organic group or where each R joins to form a divalent organic group. Types of amino groups include, but are not limited to, dihydrocarbylamino, bis(trihydrocarbylsilyl)amino, bis(dihydrocarbylhydrosilyl)amino, 1-aza-disila-1-cyclohydrocarbyl, (trihydrocarbylsilyl)(hydrocarbyl)amino, (dihydrocarbylhydrosilyl)(hydrocarbyl)amino, 1-aza-2-sila-1-cyclohydrocarbyl, dihydrocarbylamino, and 1-aza-1-cyclohydrocarbyl groups.

In one or more embodiments, hydrocarbyloxy groups or substituted hydrocarbyloxy groups such as, but not limited to, alkyloxy, cycloalkyloxy, alkenyloxy, cycloalkenyloxy, aryloxy, allyloxy, aralkyloxy, alkaryloxy, or alkynyloxy groups. Substituted hydrocarbyloxy groups include hydrocarbyloxy groups in which one or more hydrogen atoms have been replaced by a substituent such as an alkyl group. In one or more embodiments, these groups may include from one, or the appropriate minimum number of carbon atoms to form the group, to 20 carbon atoms. These groups may also contain heteroatoms such as, but not limited to, nitrogen, boron, oxygen, silicon, sulfur, tin, and phosphorus atoms.

In one or more embodiments, thiohydrocarbyloxy groups, which include substituted thiohydrocarbyloxy groups, include, but are not limited to, thioalkyloxy, thiocycloalkyloxy, thioalkenyloxy, thiocycloalkenyloxy, thioaryloxy, thioallyloxy, thioaralkyloxy, thioalkaryloxy, or thioalkynyloxy groups. Substituted thiohydrocarbyloxy groups include thiohydrocarbyloxy groups in which one or more hydrogen atoms have been replaced by a substituent such as an alkyl group. In one or more embodiments, these groups may include from one, or the appropriate minimum number of carbon atoms to form the group, to 20 carbon atoms. These groups may also contain heteroatoms such as, but not limited to, nitrogen, boron, oxygen, silicon, sulfur, tin, and phosphorus atoms.

In one or more embodiments, halogen atoms include, but are not limited to, fluorine, chlorine, bromine, and iodine.

In one or more embodiments, examples of the neutral Lewis bases include, but are not limited to, tetrahydrofuran, diethyl ether, dimethyl aniline, trimethyl phosphine, lithium chloride, neutral olefins, and neutral diolefins.

In one or more embodiments, monovalent organic groups may include hydrocarbyl groups, including substituted hydrocarbyl groups, such as, but not limited to, alkyl, cycloalkyl, alkenyl, cycloalkenyl, aryl, allyl, aralkyl, alkaryl, or alkynyl groups. Substituted hydrocarbyl groups include hydrocarbyl groups in which one or more hydrogen atoms have been replaced by a substituent such as an alkyl group. In one or more embodiments, these groups may include from one, or the appropriate minimum number of carbon atoms to form the group, to 20 carbon atoms. These groups may also contain heteroatoms such as, but not limited to, nitrogen, boron, oxygen, silicon, sulfur, tin, and phosphorus atoms.

In one or more embodiments, divalent groups include, but are not limited to, divalent organic groups and divalent silyl groups. In one or more embodiments, divalent organic groups may include hydrocarbylene groups including substituted hydrocarbylene groups. For example, hydrocarbylene groups include alkylene, cycloalkylene, alkenylene, cycloalkenylene, alkynylene, cycloalkynylene, or arylene groups. Substituted hydrocarbylene groups include hydrocarbylene groups in which one or more hydrogen atoms have been replaced by a substituent such as an alkyl group. In one or more embodiments, these groups may include two, or the appropriate minimum number of carbon atoms to form the group, to 20 carbon atoms. These groups may also contain one or more heteroatoms such as, but not limited to, nitrogen, oxygen, boron, silicon, sulfur, tin, and phosphorus atoms. In other embodiments, divalent silyl groups include silylene groups including substituted silylene groups. Substituted silylene groups include silylene groups in which one or more hydrogen atoms have been replaced by a substituent such as an alkyl group. In one or more embodiments, these groups may include two, or the appropriate minimum number of silicon atoms to form the group, to 20 carbon atoms. These groups may also contain one or more heteroatoms such as, but not limited to, nitrogen, oxygen, boron, carbon, sulfur, tin, and phosphorus atoms.

In one or more embodiments, where the Y group of formula I is a cyclopentadienyl group or a cyclopentadienyl derivative group (i.e. Cp group), the metallocene complex may be defined by the formula II:

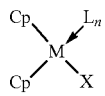

where M is a lanthanide-series element, scandium, or yttrium, each Cp is individually a cyclopentadienyl group or a cyclopentadienyl derivative group, X is hydrogen atom, a halogen atom, an hydrocarbyloxy group, a thiohydrocarbyloxy group, an amine group, a silyl group, or a monovalent organic group, each L is individually a neutral Lewis base, and n is a number from 0 through 3, or where Cp and Y are joined by a divalent group.

In one or more embodiments, where the two Cp groups of formula II are joined by a divalent group, the metallocene complex, which may be referred to as a bridged metallocene complex, may be defined by the formula III:

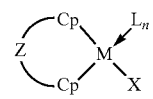

where M is a lanthanide-series element, scandium, or yttrium, each Cp is individually selected from a cyclopentadienyl group or a cyclopentadienyl derivative group, X is hydrogen atom, a halogen atom, an hydrocarbyloxy group, a thiohydrocarbyloxy group, an amine group, a silyl group, or a monovalent organic group, each L is individually a neutral Lewis base, and n is a number from 0 through 3, and Z divalent group.

In one or more embodiments, specific examples of metallocene complexes useful in the practice of this invention include, but are not limited to, bis(indenyl)gadolinium [N,N-bis(trimethylsilyl)amide], bis(2-methyl indenyl)gadolinium [N,N-bis(trimethylsilyl)amide], bis(2-phenyl indenyl) gadolinium [N,N-bis(trimethylsilyl)amide], bis(2-phenyl indenyl)gadolinium [N,N-bis(dimethylsilyl)amide], bis(1-methyl-2-phenyl indenyl)gadolinium [N,N-bis(dimethylsilyl)amide], bis(2-methyl indenyl)scandium [N,N-bis(trimethylsilyl)amide], and bis(indenyl)scandium [N,N-bis(trimethylsilyl)amide].

In one or more embodiments, the metallocene complex can be formed by combining a rare earth amide with cyclopentadiene or a cyclopentadiene derivative such as, but not limited to, 1-benzylindene.

Alkylating Agent

As mentioned above, catalyst systems employed in the present invention include an alkylating agent. In one or more embodiments, alkylating agents, which may also be referred to as hydrocarbylating agents, include organometallic compounds that can transfer one or more hydrocarbyl groups to another metal. Typically, these agents include organometallic compounds of electropositive metals such as Groups 1, 2, and 3 metals (Groups IA, IIA, and IIIA metals). Alkylating agents useful in the present invention include, but are not limited to, organoaluminum and organomagnesium compounds. As used herein, the term organoaluminum compound refers to any aluminum compound containing at least one aluminum-carbon bond other than aluminoxane. In one or more embodiments, organoaluminum compounds that are soluble in a hydrocarbon solvent can be employed. As used herein, the term organomagnesium compound refers to any magnesium compound that contains at least one magnesium-carbon bond. In one or more embodiments, organomagnesium compounds that are soluble in a hydrocarbon can be employed. As will be described in more detail below, several species of suitable alkylating agents can be in the form of a halide. Where the alkylating agent includes a halogen atom, the alkylating agent may also serve as all or part of the halogen source in the above-mentioned catalyst system.

In one or more embodiments, organoaluminum compounds that can be utilized include those represented by the general formula $AlR_nX_{3-n}$, where each R independently can be a monovalent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Organoaluminum

Types of the organoaluminum compounds that are represented by the general formula $AlR_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds. In one embodiment, when the alkylating agent includes an organoaluminum hydride compound, the above-mentioned halogen source can be provided by a tin halide, as disclosed in U.S. Pat. No. 7,008,899, which is incorporated herein by reference in its entirety.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, trib enzylaluminum, diethylphenylaluminum, diethyl-p-tolylaluminum, diethylb enzylaluminum, ethyldiphenylaluminum, ethyldi-p-tolyl-aluminum, and ethyldib enzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Organomagnesium

As mentioned above, alkylating agents useful in the present invention can comprise organomagnesium compounds. In one or more embodiments, organomagnesium compounds that can be utilized include those represented by the general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a halogen atom, a carboxylate group, an alkoxide group, or an aryloxide group. Where the alkylating agent is an organomagnesium compound that includes a halogen atom, the organomagnesium compound can serve as both the alkylating agent and at least a portion of the halogen source in the catalyst systems. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

Aluminoxanes

Another class of organoaluminum compounds suitable for use as an alkylating agent in the present invention is aluminoxanes. Aluminoxanes can comprise oligomeric linear aluminoxanes, which can be represented by the general formula:

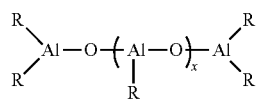

and oligomeric cyclic aluminoxanes, which can be represented by the general formula:

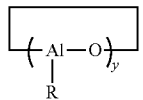

where x can be an integer in the range of from 1 to about 100, or about 10 to about 50; y can be an integer in the range of from 2 to about 100, or about 3 to about 20; and where each R independently can be a monovalent organic group that is attached to the aluminum atom via a carbon atom. In one embodiment, each R independently can be a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 20 to 80 percent of the methyl groups of methylaluminoxane with C2 to C12 hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, can be employed in combination. U.S. Publication No. 2008/0182954, which is incorporated herein by reference in its entirety, provides other examples where aluminoxanes and organoaluminum compounds can be employed in combination.

Halogen Compound

As mentioned above, the lanthanide-based catalyst systems employed in the present invention includes a halogen-containing compound, which may also be referred to as a halogen compound or halogen source, and includes at least one halogen atom. In one or more embodiments, at least a portion of the halogen source can be provided by either of the above-described lanthanide-containing compound and/or the above-described alkylating agent, when those compounds contain at least one halogen atom. In other words, the lanthanide-containing compound can serve as both the lanthanide-containing compound and at least a portion of the halogen source. Similarly, the alkylating agent can serve as both the alkylating agent and at least a portion of the halogen source.

In another embodiment, the halogen compound is present in the catalyst system in the form of a separate and distinct halogen-containing compound. Various compounds, or mixtures thereof, that contain one or more halogen atoms can be employed as the halogen source. Examples of halogen atoms include, but are not limited to, fluorine, chlorine, bromine, and iodine. A combination of two or more halogen atoms can also be utilized. Halogen-containing compounds that are soluble in a hydrocarbon solvent are suitable for use in the present invention. Hydrocarbon-insoluble halogen-containing compounds, however, can be suspended in a polymerization system to form the catalytically active species, and are therefore also useful.

Useful types of halogen-containing compounds that can be employed include, but are not limited to, elemental halogens, mixed halogens, hydrogen halides, organic halides, inorganic halides, metallic halides, and organometallic halides.

Suitable elemental halogens include, but are not limited to, fluorine, chlorine, bromine, and iodine. Some specific examples of suitable mixed halogens include iodine monochloride, iodine monobromide, iodine trichloride, and iodine pentafluoride.

Suitable hydrogen halides include, but are not limited to, hydrogen fluoride, hydrogen chloride, hydrogen bromide, and hydrogen iodide.

Suitable organic halides include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Suitable inorganic halides include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Suitable metallic halides include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Suitable organometallic halides include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

Catalyst Constituent Amounts

The catalyst composition of this invention advantageously has a technologically useful catalytic activity for polymerizing conjugated dienes into polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent (e.g. an dialkylaluminumhydride) to the metal of the rare-earth compound (e.g. Gd), which molar ratio may be represented as alkylating agent/M, can be varied from about 0.5:1 to about 50:1, in other embodiments from about 1:1 to about 30:1, and in other embodiments from about 3:1 to about 15:1.

In one or more embodiments, the molar ratio of the aluminoxane to the metal of the rare-earth compound (e.g. Gd), which molar ratio may be represented aluminoxane/M, can be varied from 1:1 to about 600:1, in other embodiments from about 10:1 to about 500:1, and in other embodiments from about 100:1 to about 400:1.

In one or more embodiments, the molar ratio of the halogen atom of the halogen-containing compound (e.g. chlorine of diethylaluminum chloride) to the metal of the rare-earth compound (e.g. Gd), which may be represented as halogen/M, is less than 2.0:1, in other embodiments less than 1.9:1, in other embodiments less than 1.8:1, in other embodiments less than 1.7:1, and in other embodiments less than 1.6:1. In these or other embodiments, the molar ratio of the halogen atom of the halogen-containing compound to the metal of the rare-earth compound is from 0.5:1 to about 2.0:1, in other embodiments from about 0.7:1 to about 1.9:1, in other embodiments from about 0.8:1 to about 1.8:1, and in other embodiments from about 1:1 to about 1.7:1.

Catalyst System Formation

The catalyst composition of this invention may be formed by combining or mixing the foregoing catalyst ingredients. Although one or more active catalyst species are believed to result from the combination of the catalyst ingredients, the degree of interaction or reaction between the various catalyst ingredients or components is not known with any great degree of certainty. The combination of or reaction product of the metallocene complex, the alkylating agent, the aluminoxane, and the halogen source is conventionally referred to as a catalyst system or catalyst composition. The term catalyst composition or catalyst system may be employed to encompass a simple mixture of the ingredients, a complex of the various ingredients that is caused by physical or chemical forces of attraction, a chemical reaction product of the ingredients, or a combination of the foregoing.

The catalyst system can be formed by employing several techniques. In one or more embodiments, the catalyst may be formed by adding the catalyst components directly to the monomer to be polymerized. In this respect, the catalyst components may be added either in a stepwise or simultaneous manner. In one embodiment, when the catalyst ingredients are added in a stepwise manner, the rare-earth compound can be added first, followed by the alkylating agent, followed by the aluminoxane compound, and optionally followed by the halogen compound. The addition of the catalyst components directly to the monomer to be polymerized may be referred to as an in situ formation of the catalyst system.

In other embodiments, the catalyst or a portion thereof may be pre-formed. In one or more embodiments, the pre-formed catalyst composition, which includes an activated catalyst, is introduced to the monomer to be polymerized prior to appreciable aging of the catalyst. For purposes of this specification, activated catalyst refers to a catalyst composition to which the halogen compound has been added or introduced. In these or other embodiments, this includes introducing a source of halogen in an amount consistent with the teachings of this invention (e.g. about 0.5:1 to about 2.0:1 relative to the gadolinium, as described above). In one or more embodiments, the activated catalyst is introduced to the monomer to be polymerized within 12 hours, in other embodiments within 6 hours, in other embodiments within 3 hours, in other embodiments within 1 hour, in other embodiments within 30 minutes, in other embodiments, within 15 minutes, in other embodiments within 7 minutes, in other embodiments within 3 minutes, and in other embodiments within 1 minute from the time that the activated catalyst is formed (i.e. the catalyst composition is activated). In other embodiments, the activated catalyst can be aged for greater than 1 hour, in other embodiments greater than 2 hours, in other embodiments greater than 4 hours, in other embodiments greater than 8 hours, and in other embodiments greater than 12 hours.

In one or more embodiments, reference to monomer to be polymerized refers to that monomer used in the formation of the targeted high-molecular weight polymer. It does not refer to any monomer that may be employed in pre-forming the catalyst composition. In one or more embodiments, the monomer to be polymerized includes that monomer present when the polymerization system includes less than 0.1 mmol, in other embodiments less than 0.07 mmol, and in other embodiments less than 0.03 mmol of rare earth metal per 100 gram of monomer.

As the skilled person will appreciate, pre-formation of the catalyst can take place by employing a variety of techniques. For example, two or more of the catalyst ingredients may be introduced and pre-mixed outside of the monomer to be polymerized. For example, the rare-earth compound and the alkylating agent may be combined within an appropriate solvent, optionally in the presence of a small amount of at least one conjugated diene monomer at an appropriate temperature, to form a blend. Then, the aluminoxane compound may be introduced to the blend of the rare-earth compound and the alkylating agent. Then, the halogen-containing compound may be introduced to the blend of the rare-earth compound, the alkylating agent, and the aluminoxane to form the pre-formed catalyst (i.e. active catalyst). In other embodiments, the aluminoxane and the halogen-containing compound can be combined and then added blend of the rare-earth compound and the alkylating agent.

In yet other embodiments, the catalyst is pre-formed by combining the rare-earth compound with the halogen compound to form a precursor complex. This precursor may be formed within an appropriate solvent optionally in the presence of a small amount of monomer. The alkylating agent and the aluminoxane can then be combined with the precursor to form the preformed catalyst. In other embodiments, the precursor complex and the alkylating agent and the aluminoxane can be added separately and individually to the monomer to be polymerized.

As indicated above, a rare-earth complex can be formed as part of the process of forming the pre-formed catalyst. As indicated above, the complex can be formed by combining a rare-earth amide with cyclopentadiene or a cyclopentadiene derivative. These compounds can be combined, and once combined, the other ingredients of the catalyst composition can be added including the alkylating agent, the aluminoxane, and the halogen-containing compound.

In particular embodiments, the preformation of the catalyst may occur either in the absence of any monomer or in the presence of a small amount of at least one conjugated diene monomer at an appropriate temperature, which is generally from about –20° C. to about 80° C. In one or more embodiments, the monomer is isoprene. In other embodiments, the monomer is butadiene. In other embodiments, mixtures of conjugated diene monomers may also be used. The amount of conjugated diene monomer that may be used for preforming the catalyst can range from about 1 to about 500 moles, in other embodiments from about 5 to about 250 moles, and in other embodiments from about 10 to about 100 moles per mole of the metallocene complex.

In one or more embodiments, a solvent may be employed as a carrier to either dissolve or suspend the catalyst or catalyst ingredients in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent.

In one or more embodiments, suitable solvents include those organic compounds that will not undergo polymerization or incorporation into propagating polymer chains during the polymerization of monomer in the presence of catalyst. In one or more embodiments, these organic solvents are inert to the catalyst. In one or more embodiments, these organic solvent are liquid at ambient temperature and pressure. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

Monomer

In one or more embodiments, examples of conjugated diene monomer that can be polymerized according to the present invention include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. In particular embodiments, the monomer is isoprene.

Polymerization System

The production of polydienes according to this invention can be accomplished by polymerizing conjugated diene monomer in the presence of a catalytically effective amount of the foregoing catalyst composition. The introduction of the catalyst composition, the conjugated diene monomer, and any solvent if employed, forms a polymerization mixture in which the polymer product is formed. The total catalyst concentration to be employed in the polymerization mixture may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used.

In one or more embodiments, the amount of the metallocene complex used can be varied from about 0.005 to about 0.1 mmol, in other embodiments from about 0.008 to about 0.07 mmol, and in other embodiments from about 0.01 to about 0.05 mmol of metallocene complex per 100 g of conjugated diene monomer to be polymerized. In one or more embodiments, the amount of metallocene complex used in the polymerization is less than 0.5 mmol, in other embodiments less than 0.07 mmol, and in other embodiments less than 0.05 mmol, and in other embodiments less than 0.03 mmol of metallocene complex per 100 g of conjugated diene monomer to be polymerized.

In one or more embodiments, the polymerization may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst. Exemplary solvents have been set forth above. In one or more embodiments, the solids content (i.e. monomer, polymer, and catalyst) of the polymerization system may be less than 80 wt %, in other embodiments less than 50 wt %, and in other embodiments less than 20 wt %, with the balance being the weight of the solvent (i.e. a solvent content of more than 20%, or more than 50% by weight, or more than 80% by weight based on the total weight of the polymerization mixture).

In one or more embodiments, the polymerization system in which the polymerizations are conducted is a generally high-solids polymerization system. In one or more embodiments, the solids content (i.e. monomer, polymer, and catalyst) is greater than 15 wt %, in other embodiments greater than 18 wt %, and in other embodiments greater than 20 wt %, with the balance being the weight of the solvent. In these or other embodiments, the solids content of the polymerization system is from about 15 to about 30 wt %, on other embodiments from about 18 to about 27 wt %, and in other embodiments from about 20 to about 25 wt %.

In other embodiments, the polymerization system employed in the present invention may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In another embodiment, the polymerization mixture contains no solvents other than those that are inherent to the raw materials employed. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in conventional polymerization vessels known in the art. In one or more embodiments, the polymerization can be conducted in a conventional stirred-tank reactor, especially if the monomer conversion is less than about 60%. In particular embodiments, especially where bulk polymerization is conducted, polymerization may occur within a first vessel to a monomer conversion of less than 20%, in other embodiments less than 15%, and in other embodiments less than 12%, and the polymer and unreacted monomer is removed from the first reactor and the polymerization is terminated. Examples of useful bulk polymerization processes employing low monomer conversion are disclosed in U.S. Pat. No. 7,351,776, which is incorporated herein by reference. In other embodiments, especially where the monomer conversion is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. The polymerization temperature may be varied. However, due to the limited solubility of cis-1,4-polybutadiene in 1,3-butadiene monomer at elevated temperatures, it is preferable to employ a relatively low polymerization temperature in order to maintain the polymerization mass in a single-phase homogeneous system, which allows the polymer molecular weight to be rigorously controlled and gives a uniform polymer product. In one or more embodiments, the conditions under which the polymerization proceeds may be controlled to maintain the temperature of the polymerization mixture within a range from about 0° C. to about 50° C., in other embodiments from about 5° C. to about 45° C., and in other embodiments from about 10° C. to about 40° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmospheres, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

The polymerization can be carried out to any desired conversions before the polymerization is terminated. In one or more embodiments, however, it may be desirable to avoid the high cement viscosity resulting from high conversions, as well as the possible separation of polymer as a solid phase from the monomer at high conversions due to the limited solubility of the polydiene within the solvent or monomer.

Polymer Modification

The polydienes produced by the polymerization process of this invention may possess pseudo-living characteristics, such that some of polymer chains in these polymers have reactive chain ends. Once a desired monomer conversion is achieved, a functionalizing agent may optionally be introduced into the polymerization mixture to react with any reactive polymer chains so as to give a functionalized polymer. In one or more embodiments, the functionalizing agent is introduced prior to contacting the polymerization mixture with a quenching agent. In other embodiments, the functionalizing may be introduced after the polymerization mixture has been partially quenched with a quenching agent.

In one or more embodiments, functionalizing agents include compounds or reagents that can react with a reactive polymer produced by this invention and thereby provide the polymer with a functional group that is distinct from a propagating chain that has not been reacted with the functionalizing agent. The functional group may be reactive or interactive with other polymer chains (propagating and/or non-propagating) or with other constituents such as reinforcing fillers (e.g. carbon black) that may be combined with the polymer. In one or more embodiments, the reaction between the functionalizing agent and the reactive polymer proceeds via an addition or substitution reaction.

Useful functionalizing agents may include compounds that provide a functional group at the end of a polymer chain without joining two or more polymer chains together, as well as compounds that couple or join two or more polymer chains together via a functional linkage to form a single macromolecule. The latter type of functionalizing agents may also be referred to as coupling agents.

In one or more embodiments, functionalizing agents include compounds that will add or impart a heteroatom to the polymer chain. In particular embodiments, functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, suitable functionalizing agents include those compounds that contain groups that may react with pseudo-living polymers (e.g., those produced in accordance with this invention). Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Publ. No. 2007/0149717, hydrobenzamide compounds as disclosed in U.S. Publ. No. 2007/0276122, nitro compounds as disclosed in U.S. Publ. No. 2008/0051552, and protected oxime compounds as disclosed in U.S. Publ. No. 2008/0146745, all of which are incorporated herein by reference.

In particular embodiments, the functionalizing agents employed may be coupling agents which include, but are not limited to, metal halides such as tin tetrachloride, metalloid halides such as silicon tetrachloride, metal ester-carboxylate complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

The amount of functionalizing agent introduced to the polymerization mixture may depend upon various factors including the type and amount of catalyst used to initiate the polymerization, the type of functionalizing agent, the desired level of functionality and many other factors. In one or more embodiments, the amount of functionalizing agent employed may be represented as a molar ratio of the functionality of the functionalizing agent to the metal of the metallocene complex (funct/M). In one or more embodiments, the molar ratio (funct/M) may be from about 0.5:1 to about 300:1, in other embodiments from about 1:1 to about 200:1, in other embodiments from about 10:1 to about 100:1, and in other embodiments from about 20:1 to about 50:1.

Because reactive polymer chains may slowly self-terminate at high temperatures, in one embodiment the functionalizing agent may be added to the polymerization mixture once a peak polymerization temperature is observed. In other embodiments, the functionalizing agent may be added within about 25 to 35 minutes after the peak polymerization temperature is reached.

In one or more embodiments, the functionalizing agent may be introduced to the polymerization mixture after a desired monomer conversion is achieved but before a quenching agent containing a protic hydrogen atom is added. In one or more embodiments, the functionalizing agent is added to the polymerization mixture after a monomer conversion of at least 5%, in other embodiments at least 10%, in other embodiments at least 20%, in other embodiments at least 50%, and in other embodiments at least 80%. In these or other embodiments, the functionalizing agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15%. In one or more embodiments, the functionalizing agent is added after complete, or substantially complete monomer conversion. In particular embodiments, a functionalizing agent may be introduced to the polymerization mixture immediately prior to, together with, or after the introduction of a Lewis base as disclosed in U.S. Pat. No. 8,324,329, which is incorporated herein by reference.

In one or more embodiments, the functionalizing agent may be introduced to the polymerization mixture at a location (e.g., within a vessel) where the polymerization (or at least a portion thereof) has been conducted. In other embodiments, the functionalizing agent may be introduced to the polymerization mixture at a location that is distinct from where the polymerization (or at least a portion thereof) has taken place. For example, the functionalizing agent may be introduced to the polymerization mixture in downstream vessels including downstream reactors or tanks, in-line reactors or mixers, extruders, or devolatilizers.

Quenching and Additives

Once a functionalizing agent has been introduced to the polymerization mixture and a desired reaction time has been provided, a quenching agent may be optionally added to the polymerization mixture in order to deactivate any residual reactive polymer, catalyst, and/or catalyst components. In one or more embodiments, quenching agents include protic compounds, such as, but not limited to, water, alcohols, carboxylic acids, inorganic acids, or a mixture thereof. In particular embodiments, the quenching agent includes a polyhydroxy compound as disclosed in U.S. Pat. No. 7,879,958, which is incorporated herein by reference.

An antioxidant such as 2,6-di-t-butyl-4-methylphenol may be added along with, before, or after the addition of the quenching agent. The amount of the antioxidant employed may be in the range of about 0.2% to about 1% by weight of the polymer product. The quenching agent and the antioxidant may be added as neat materials or, if necessary, dissolved in a hydrocarbon solvent or conjugated diene monomer prior to being added to the polymerization mixture.

Polymer Cement Dilution

In one or more embodiments, following polymerization of the monomer, or at least a substantial portion of the monomer, the polymerization mixture may be diluted. This may be particularly useful where the polymerization was conducted at relatively high solids content (e.g. above 15 wt % solids) as defined above. The solvent used to dilute the polymerization mixture may be the same or different than the solvent used during the polymerization. In one or embodiments, sufficient solvent is added to the polymerization mixture, which may also be referred to as polymer cement when the solids portion is substantially polymer, to obtain a polymerization mixture having less than 15 wt %, in other embodiments less than 12 wt %, and in other embodiments less than 10 wt % solids. In one or more embodiments, to polymerization mixture is diluted to a solids concentration of from about 7 to about 15 wt %, in other embodiments from about 8 to about 13 wt %, and in other embodiments from about 9 to about 12 wt %.

Isolation

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Polymer Properties

Where cis-1,4-polydienes (e.g., cis-1,4-polyisoprene) are produced by one or more embodiments of the process of this invention, the cis-1,4-polydienes may advantageously have a cis-1,4 linkage content in excess of 95%, in other embodiments in excess of 96%, in other embodiments in excess of 97%, in other embodiments in excess of 98%, and in other embodiments in excess of 99%. In these or other embodiments, the cis-1,4-polydienes may advantageously have a vinyl content of less than 5%, in other embodiments less than 4%, in other embodiments less than 3%, in other embodiments less than 2%, and in other embodiments less than 1%. In these or other embodiments, the cis-1,4-polydienes may advantageously have a trans-1,4 linkage content of less than 5%, in other embodiments less than 4%, in other embodiments less than 3%, in other embodiments less than 2%, and in other embodiments less than 1%. The polymer microstructure, including cis-1,4-linkage content, trans-1,4-linkage content, and vinyl content can be determined by NMR spectroscopy.

In one or more embodiments, the polydienes produced by the process of the present invention may have a weight average molecular weight ($M_w$) of greater than 750, in other embodiments greater than 1200, and in other embodiments greater than 1500 kg/mol. In one or more embodiments, polydienes produced by the process of the present invention may have a weight average molecular weight ($M_w$) of from about 300 to about 2500 kg/mol, in other embodiments from about 750 to about 2000 kg/mol, and in other embodiments from about 1300 to about 1800 kg/mol. In one or more embodiments, the polydienes produced by the process of the present invention exhibit a molecular weight distribution ($M_w/M_n$) of less than 2.7, in other embodiments less than 2.5, in yet other embodiments less than 2.2, and in still other embodiments less than 2.0. The polymer molecular weight ($M_w$ and $M_n$) can be determined by gel permeation chromatography (GPC) using THF as a solvent and polystyrene standards.

In particular embodiments, the cis-1,4-polydienes produced by the process of present invention have a cis-1,4-linkage content of greater than 98.4% and a molecular weight distribution of less than 2.0. This is advantageous because cis-1,4-polydienes having a narrower molecular weight distribution give lower hysteresis, whereas cis-1,4-polydienes having a higher cis-1,4-linkage content exhibit the increased ability to undergo strain-induced crystallization and thus give superior physical properties such as higher tensile strength and higher abrasion resistance.

In one or more embodiments, the polydienes produced by the process of the present invention exhibit a percent functionality, prior to quenching, of at least 35%, in other embodiments at least 40%, and in other embodiments at least 43%. The polymer percent functionality can be determined by using GPC equipped with a differential refractive index detector and an ultraviolet absorption detector using methodologies as described in U.S. Pat. No. 8,017,695, which is incorporated herein by reference.

INDUSTRIAL APPLICATION

The cis-1,4-polydienes produced by the process of the present invention exhibit excellent viscoelastic properties and are particularly useful in the manufacture of various tire components including, but not limited to, tire treads, sidewalls, subtreads, and bead fillers. The cis-1,4-polydienes can be used as all or part of the elastomeric component of a tire stock. When the cis-1,4-polydienes are used in conjunction with other rubbers to form the elastomeric component of a tire stock, these other rubbers may be natural rubber, synthetic rubbers, and mixtures thereof. Examples of synthetic rubber include polyisoprene, poly(styrene-co-butadiene), polybutadiene with low cis-1,4-linkage content, poly(styrene-co-butadiene-co-isoprene), and mixtures thereof. The cis-1,4-polydienes can also be used in the manufacture of hoses, belts, shoe soles, window seals, other seals, vibration damping rubber, and other industrial products.

EXAMPLES

In order to demonstrate the practice of the present invention, the following examples have been prepared and tested. The examples should not, however, be viewed as limiting the scope of the invention. The claims will serve to define the invention.

Samples 1-12

In a glove box, a N2-purged vessel was charged with 75 mg of tris[N,N-bis(trimethylsilyl)amide] gadolinium, 2.24 ml of a 0.11 M solution of 1-benzylindene in hexanes, and 0.70 ml of a 1.00 M solution of diisobutylaluminum hydride (DIBAL) in hexanes. The vessel was capped and allowed to age overnight. After the aging time, 17.53 ml of a 2.01 M solution of aluminoxane (blend of methylaluminoxane and isopropylaluminoxane) in heptane was added, and the resulting composition was allowed to age for 6 hours. A 1.08 M solution of diethylaluminum chloride (DEAC) in hexanes was then charged (in the amounts provided in Table 1 below) to form four distinct activated catalyst compositions. These activated catalyst compositions were aged overnight before being used in polymerizations as described below.

Polymerizations were conducted in 750 ml N2-purged glass bottles. The bottles were individually charged with 276.5 g of hexanes and 73.5 g of isoprene to thereby produce a solution of 21% by weight isoprene. Three bottles were charged with 5.18 ml from each of the four prepared catalyst compositions to thereby form 12 samples. The bottles were placed in an agitating bath at 50° C. Bottles from each catalyst were removed from the bath after 2, 3 or 4 hours of agitation as represented in Table 1. The polymer was terminated by charging the polymerization mixture with 4.0 ml of a 10 wt % solution of 2,6-di-tert-butyl-4-methylphenol in isopropanol. The polymers were coagulated in 8 L isopropanol containing 15 g of 2,6-di-Cert-butyl-4-methylphenol and then drum-dried. The polymers were analyzed by GPC and NMR with those values reported in Table 1.

TABLE 1

| Samples: | 1 | 2 | 3 | 4 | 5 | 6 | 7 | 8 | 9 | 10 | 11 | 12 |
|---|---|---|---|---|---|---|---|---|---|---|---|---|
| Chloride Loading | 1.6 | 1.6 | 1.6 | 1.8 | 1.8 | 1.8 | 2.0 | 2.0 | 2.0 | 2.2 | 2.2 | 2.2 |
| Agitation Time (hrs) | 2 | 3 | 4 | 2 | 3 | 4 | 2 | 3 | 4 | 2 | 3 | 4 |
| % Conversion | 94.1 | 96.5 | 96.2 | 82.3 | 83.5 | 96.6 | 59.8 | 83.3 | 91.2 | 13.3 | 26.3 | 35.1 |
| Mn (×10$^3$) (g/mol) | 552 | 556 | 540 | 564 | 577 | 598 | 540 | 471 | 629 | 328 | 399 | 467 |
| Mw (×10$^3$) (g/mol) | 1063 | 1036 | 1040 | 1074 | 1137 | 1136 | 1043 | 1156 | 1242 | 731 | 921 | 1047 |
| Mw/Mn | 1.93 | 1.86 | 1.93 | 1.90 | 1.97 | 1.90 | 1.93 | 2.03 | 1.98 | 2.23 | 2.31 | 2.24 |
| % Cis | 98.3 | n/d | n/d | 98.6 | n/d | n/d | 98.8 | n/d | n/d | 98.9 | n/d | n/d |
| % Trans | 0.5 | n/d | n/d | 0.3 | n/d | n/d | 0.3 | n/d | n/d | 0.1 | n/d | n/d |
| % Vinyl | 1.2 | n/d | n/d | 1.0 | n/d | n/d | 1.0 | n/d | n/d | 1.0 | n/d | n/d |

The number average ($M_n$) and weight average ($M_w$) molecular weights of the polymer samples were determined by gel permeation chromatography (GPC) using a Tosoh Ecosec HLC-8320GPC system and Tosoh TSKgel GMHxi-BS columns with THF as a solvent. The system was calibrated using a series of polystyrene standards. The cis-1,4-linkage, trans-1,4-linkage, and 1,2-linkage contents of the polymer samples were determined by NMR spectroscopy.

As evidenced by Table 1, and as graphically shown in FIG. 1, the polyisoprene conversion rapidly drops as the chloride loading passes 1.8 equivalents per equivalent of Gd (i.e. molar ratio of 1.8:1). At 1.6 equivalents of chloride, conversion is over 94% after only 2 hours while it takes 4 hours to reach that level at 1.8 equivalents. At 2.0 equivalents, only 91.2% conversion is reached in 4 hours and with 2.2 equivalents only 35.1% conversion is achieved in 2 hours. Surprisingly, the rate of polymerization decreased rapidly with increasing chloride loading.

Samples 13-14

A 12-oz. N2-purged glass bottle was charged with 67 mg of tris[N,N-bis(trimethylsilyl)amidel] gadolinium, 2.00 mL of a 0.11 M solution of 1-benzylindene in hexanes, and 0.63 mL of a 1.00 M solution of diisobutylaluminum hydride (DIBAL) in hexanes. The vessel was capped and allowed to age overnight. After the aging time, 15.7 mL of a 2.01 M solution of MMAO-3A in heptane was added. The catalyst was allowed to age 6 hr. The catalyst was then charged with 0.18 mL of a 1.08 M solution of diethylaluminum chloride (DEAC) in hexanes. The catalyst was aged overnight before charging to monomer solution.

A nitrogen purged jacketed steal reactor was charged with anhydrous hexanes and pure isoprene to make 4.4 lbs. of a 21 wt % solution of isoprene in hexanes. The jacket temperature of the reactor was set to 80° F. and the reactor was allowed to equilibrate. The catalyst solution was rapidly charged into the reactor and the jacket temperature was set to 122° F. The solution temperature and reactor pressure were monitored via sensors located inside the vessel. After 210 minutes the polymer cement was diluted with 4.41 lbs of hexanes to afford a 10.5 wt % solution. A sample was collected for conversion analysis in a small bottle. The conversion of the reaction was determined by evaporating a pre-weighed quantity of the cement and thereby determining the percent solids of the cement compared to the final 10.5 wt % isoprene. The polymerization was quenched by dropping the polymer cement into a bucket containing ~8 L isopropyl alcohol and 15 g of 2,6-di-tert-butyl-4-methylphenol. The polymer was coagulated and then drum dried. The polymers were analyzed by GPC and NMR with those values reported in Table 2.

A 12-oz. N2-purged glass bottle was charged with 67 mg of tris[N,N-bis(trimethylsilyl)amide] gadolinium, 2.00 mL of a 0.11 M solution of 1-benzylindene in hexanes, and 0.63 mL of a 1.00 M solution of diisobutylaluminum hydride (DIBAL) in hexanes. The vessel was capped and allowed to age overnight. After the aging time, 15.7 mL of a 2.01 M solution of MMAO-3A in heptane was added. The catalyst was allowed to age 6 hr. The catalyst was then charged with 0.18 mL of a 1.08 M solution of diethylaluminum chloride (DEAC) in hexanes. The catalyst was aged overnight before charging to monomer solution.

A nitrogen purged jacketed steal reactor was charged with anhydrous hexanes and pure isoprene to make 8.8 lbs. of a 10.5 wt % solution of isoprene in hexanes. The jacket temperature of the reactor was set to 80° F. and the reactor was allowed to equilibrate. The catalyst solution was rapidly charged into the reactor and the jacket temperature was set to 122° F. The solution temperature and reactor pressure were monitored via sensors located inside the vessel. After 407 minutes, a sample was collected for conversion analysis in a small bottle. The conversion of the reaction was determined by evaporating a pre-weighed quantity of the cement and thereby determining the percent solids of the cement compared to the final 10.5 wt % isoprene. The polymerization was quenched by discharging the polymer cement into a bucket containing ~8 L isopropyl alcohol and 15 g of 2,6-di-tert-butyl-4-methylphenol. The polymer was coagulated and then drum dried. The polymers were analyzed by GPC and NMR with those values reported in Table 2.

TABLE 2

| Samples | 13 | 14 |
|---|---|---|
| % Solids Polymerization | 21.0 | 10.5 |
| % Solids Final | 10.5 | 10.5 |
| Time to Peak (min.) | 153 | 112 |
| Peak Polymerization Temp (° F.) | 140.5 | 121.2 |
| Polymerization Time (min.) | 210 | 407 |
| % Conversion | 83.5 | 16.5 |
| Mn (×10³) (g/mol) | 744 | 526 |
| Mw (×10³) (g/mol) | 1,535 | 1,258 |
| Mw/Mn | 2.06 | 2.39 |
| % cis | 98.6 | 98.9 |
| % Trans | 0.2 | 0.0 |
| % Vinyl | 1.2 | 1.1 |

By conducting the polymerization at high solids (21%), activity was maximized. Dilution of the cement prior to discharging it from the reactor was necessary to afford a low enough viscosity to permit the cement to flow through the necessary tubing. If polymerization had been conducted at this lower solids level, activity would have been too low to achieve high conversion even at almost twice the polymerization time.

Various modifications and alterations that do not depart from the scope and spirit of this invention will become apparent to those skilled in the art. This invention is not to be duly limited to the illustrative embodiments set forth herein.

What is claimed is:

1. A process for preparing a polydiene, the process comprising:
   (i) preparing an active catalyst composition by combining (a) a rare-earth metallocene compound including gadolinium, (b) an alkylating agent, (c) an aluminoxane, and optionally (d) a halogen-containing compound, where the catalyst composition includes halogen at molar ratio to a rare-earth metal of from about 0.5:1 to about 2.0:1; and
   (ii) introducing the active catalyst composition to conjugated diene monomer.

2. The process of claim 1, where the rare-earth metallocene compound is defined by the formula I

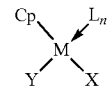

where M is gadolinium, Cp is a cyclopentadienyl group or a cyclopentadienyl derivative group, Y is a hydrocarbyloxy group, a thiohydrocarbyloxy group, an amine group, a silyl group, cyclopentadienyl group, or a cyclopentadienyl derivative group, X is hydrogen atom, a halogen atom, a hydrocarbyloxy group, a thiohydrocarbyloxy group, an amine group, a silyl group, or a monovalent organic group, each L is individually a neutral Lewis base, and n is a number from 0 through 3, or where Cp and Y are joined by a divalent group.

3. The process of claim 2, where Y is a cyclopentadienyl group or a cyclopentadienyl derivative group.

4. The process of claim 2, where Y is a hydrocarbyloxy group, a thiohydrocarbyloxy group, an amine group, or a silyl group.

5. The process of claim 2, where Y is a hydrocarbyloxy group.

6. The process of claim 2, where Y is a thiohydrocarbyloxy group.

7. The process of claim 2, where Y is an amine group.

8. The process of claim 2, where Y is a silyl group.

9. The process of claim 2, where Cp and Y are joined by a divalent group.

10. The process of claim 1, where the conjugated diene monomer is isoprene.

11. The process of claim 1, where the alkylating agent is an organoaluminum compound.

12. The process of claim 1, where the alkylating agent is an organomagnesium compound.

13. The process of claim 1, where the catalyst composition includes a halogen to gadolinium molar ratio of from 0.7:1 to 1.9:1.

14. The process of claim 1, where the catalyst composition includes a molar ratio of the alkylating agent to gadolinium of from about 0.5:1 to about 50:1, and a molar ratio of the aluminoxane to gadolinium of from about 1:1 to about 600:1, and where from about 0.0005 to about 0.01 mmol of a metallocene complex is used per 100 g of the conjugated diene monomer.

15. The process of claim 1, where said step of introducing achieves a monomer conversion of from about 5% to about 60%.

16. The process of claim 1, where said step of introducing the active catalyst composition to conjugated diene monomer produces a polymerization mixture, and where the polymerization mixture has a solids content that is greater than 15 wt %.

17. The process of claim 1, where, after said step of introducing the active catalyst composition to conjugated diene monomer, diluting the polymerization mixture with a solvent to thereby form a polymerization mixture having a solids content of less than 15 wt %.

18. The process of claim 10, where the process produces a polydiene having a cis-1,4-linkage content of greater than 98.4% and a molecular weight distribution of less than 2.3.

19. The process of claim 1, where the catalyst composition includes a halogen to gadolinium molar ratio of from 0.8: to 1.8:1.

20. The process of claim 1, where the catalyst composition includes a halogen to gadolinium molar ratio of from 1:1 to 1.7:1.

* * * * *